(12) United States Patent
Saffarian

(10) Patent No.: US 6,796,488 B1
(45) Date of Patent: *Sep. 28, 2004

(54) AUTOMATED SYSTEM AND METHOD FOR CHECK AMOUNT ENCODING AT A POINT-OF-SALE

(75) Inventor: Amir M. Saffarian, Fairview, NJ (US)

(73) Assignee: Electronic Data Systems Corporation, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,022

(22) Filed: Mar. 27, 1997

(51) Int. Cl.[7] .............................................. G06F 17/60
(52) U.S. Cl. ........................................ 235/379; 705/33
(58) Field of Search ................................ 235/379–381; 705/14, 17, 24, 33, 10, 45; 400/105

(56) References Cited

U.S. PATENT DOCUMENTS

| | | | | |
|---|---|---|---|---|
| 3,790,193 A | * | 2/1974 | McBride | 283/57 |
| 4,015,701 A | | 4/1977 | Templeton | 197/127 R |
| 4,027,142 A | | 5/1977 | Paup et al. | 235/61.9 R |
| 4,053,735 A | * | 10/1977 | Foudos | 235/380 |
| 4,109,238 A | | 8/1978 | Creekmore | 340/149 A |
| 4,201,978 A | | 5/1980 | Nally | 340/146.3 |
| 4,277,689 A | | 7/1981 | Thomas et al. | 250/567 |
| 4,404,649 A | | 9/1983 | Nunley et al. | 364/900 |
| 4,523,330 A | | 6/1985 | Cain | 382/7 |
| 4,617,457 A | | 10/1986 | Granzow et al. | 235/379 |
| 4,623,965 A | * | 11/1986 | Wing | 705/33 |
| 4,635,219 A | * | 1/1987 | Howard | 708/173 |
| 4,672,377 A | | 6/1987 | Murphy et al. | 340/825.34 |
| 4,678,895 A | | 7/1987 | Tateisi et al. | 235/379 |
| 4,727,243 A | | 2/1988 | Savar | 235/379 |

(List continued on next page.)

FOREIGN PATENT DOCUMENTS

| | | | | |
|---|---|---|---|---|
| FR | 002508204 A1 | 6/1981 | | G06K/9/00 |
| WO | 84/02597 | 7/1984 | | G06K/17/00 |
| WO | 86/00441 | 1/1986 | | G06F/15/21 |

OTHER PUBLICATIONS

Tim O'Reilly, The Dallas Morning News, Checks and Balances, Jul. 25, 1993, Sunday Home Final Edition, p. 1.*
Damark Mail Order Catalog, Item No. B–9083–548971 by Panasonic entitled "Electronic Check–Writing System".

Primary Examiner—Michael G. Lee
Assistant Examiner—Jamara A. Franklin
(74) Attorney, Agent, or Firm—Baker Botts L.L.P.

(57) ABSTRACT

An automated check encoding system (200) at a point-of-sale includes a point-of-sale register (202) for determining a transaction amount, and an input device (208) coupled to the point-of-sale register (202) for receiving the transaction amount and determining a check amount in response to receiving an input from a user. A check encoder (204) is coupled to the point-of-sale register (202) and the input device (208) for receiving the check amount and encoding the check amount in a machine-readable format at a predetermined location (310) on a blank check (210).

4 Claims, 2 Drawing Sheets

U.S. PATENT DOCUMENTS

| | | | | |
|---|---|---|---|---|
| 4,758,714 A | * | 7/1988 | Carlson et al. | 235/380 |
| 4,810,866 A | | 3/1989 | Lord, Jr. | 235/379 |
| 4,851,655 A | * | 7/1989 | Stone et al. | 235/375 |
| 4,891,503 A | | 1/1990 | Jewell | 235/380 |
| 4,933,536 A | | 6/1990 | Lindemann et al. | 235/375 |
| 4,948,174 A | * | 8/1990 | Thomson et al. | 283/58 |
| 5,044,668 A | * | 9/1991 | Wright | 283/58 |
| 5,050,207 A | * | 9/1991 | Hitchcock | 235/382 |
| 5,053,607 A | * | 10/1991 | Carlson et al. | 235/379 |
| 5,054,092 A | | 10/1991 | LaCaze | 382/11 |
| 5,097,517 A | * | 3/1992 | Holt | 382/7 |
| 5,121,945 A | * | 6/1992 | Thomson et al. | 283/58 |
| 5,187,351 A | * | 2/1993 | Clary | 235/379 |
| 5,198,975 A | | 3/1993 | Baker et al. | 364/406 |
| 5,208,869 A | * | 5/1993 | Holt | 382/7 |
| 5,233,547 A | * | 8/1993 | Kapp et al. | 708/106 |
| 5,245,164 A | | 9/1993 | Oyama | 235/379 |
| 5,253,345 A | | 10/1993 | Fernandes et al. | 395/275 |
| 5,299,295 A | * | 3/1994 | Kim et al. | 358/1.12 |
| 5,310,997 A | | 5/1994 | Roach et al. | 235/375 |
| 5,321,238 A | | 6/1994 | Kamata et al. | 235/379 |
| 5,372,436 A | * | 12/1994 | Kimura | 705/33 |
| 5,373,550 A | | 12/1994 | Campbell et al. | 379/100 |
| 5,377,271 A | * | 12/1994 | Foreman et al. | 380/51 |
| 5,426,281 A | | 6/1995 | Abecassis | 235/379 |
| 5,430,644 A | | 7/1995 | Deaton et al. | 364/401 |
| 5,440,106 A | * | 8/1995 | Duck | 235/3 |
| 5,444,616 A | * | 8/1995 | Nair et al. | 364/405 |
| 5,444,794 A | | 8/1995 | Uhland, Sr. | 382/137 |
| 5,448,471 A | | 9/1995 | Deaton et al. | 364/401 |
| 5,470,160 A | * | 11/1995 | Nowlin | 400/105 |
| 5,475,403 A | * | 12/1995 | Havlovick et al. | 705/33 |
| 5,484,988 A | * | 1/1996 | Hills et al. | 235/379 |
| 5,506,691 A | | 4/1996 | Bednar et al. | 358/402 |
| 5,532,464 A | | 7/1996 | Josephson et al. | 235/379 |
| 5,542,487 A | * | 8/1996 | Schultz et al. | 178/41 A |
| 5,544,043 A | | 8/1996 | Miki et al. | 364/406 |
| 5,583,759 A | | 12/1996 | Geer | 395/245 |
| 5,583,783 A | * | 12/1996 | Yasui | 700/213 |
| 5,592,377 A | | 1/1997 | Lipkin | 395/242 |
| 5,678,937 A | * | 10/1997 | Smith | 400/78 |
| 5,679,938 A | * | 10/1997 | Templeton et al. | 235/379 |
| 5,679,940 A | | 10/1997 | Templeton et al. | 235/380 |
| 5,684,286 A | * | 11/1997 | Pierce | 235/454 |
| 5,781,654 A | | 7/1998 | Carney | 382/137 |
| 5,783,808 A | | 7/1998 | Josephson | 235/379 |
| 5,789,727 A | * | 8/1998 | Teradaira et al. | 235/449 |
| 5,801,366 A | | 9/1998 | Funk et al. | 235/380 |
| 5,832,463 A | * | 11/1998 | Funk | 235/375 |
| 5,890,141 A | | 3/1999 | Carney et al. | 705/45 |
| 5,895,904 A | * | 4/1999 | Nissim | 235/380 |
| 6,029,887 A | * | 2/2000 | Furuhashi et al. | 235/379 |
| 6,119,931 A | * | 9/2000 | Novogrod | 235/379 |

* cited by examiner

AUTOMATED SYSTEM AND METHOD FOR CHECK AMOUNT ENCODING AT A POINT-OF-SALE

TECHNICAL FIELD OF THE INVENTION

This invention is related in general to the field of document handling systems. More particularly, the invention is related to an automated system and method for check amount encoding at a point-of-sale.

BACKGROUND OF THE INVENTION

The typical check processing procedure in use today is a long and tedious process, which requires one or more processing days and multiple repetitive steps. The typical procedure includes many opportunities for errors to be introduced.

The conventional check processing procedure is shown in FIG. 1 and begins, for example, at a retailer or point-of-sale. The cashier enters all the purchases and the register provides a total. The customer writes out a check for a specific dollar amount and presents it as payment for the amount owed, as shown in block 100. The retailer may check its internally-maintained "bad check" list or with a check authorization service to determine if the account being drawn on has a history of under-funded checks. If the account has not been black listed, then the checking account owner may leave the retailer with the goods that were purchased. At the end of the day, the total of all checks received that day are totaled to compare with the register total. The register totals are combined to form a store total. The checks are then deposited with the retailer's bank.

Some retailers have facilities to encode the transaction amounts on the checks before the checks are sent to the bank. Otherwise, the bank encodes the amounts on the checks, as shown in block 102, and charges the retailer a fee for this service. The encoding process is performed manually and labor-intensive, with an operator physically handling each check, viewing the amount, and then keying it on the face of the check. The check amount is then encoded in magnetic ink on the face of the check in a predetermined field or location, such as the bottom right of the check in alignment with the MICR line. The encoding speed per operator is slow, typically 1,200 to 1,400 checks per hour. Because this processing step relies heavily on the human operator, who must process a large quantity of documents in a short time, it is prone to errors. The check amount may be encoded incorrectly due to poor penmanship, the check amounts from the two fields of the check not matching, or a number of other reasons. The encoded checks are then tallied and compared with the total on the deposit ticket. This process is commonly termed "proofing."

The encoded checks are then shipped to a central processing location for the "capturing" step, as shown in block 104. High speed reader/sorters such as the 3890 document reader manufactured by IBM process the checks by reading and sorting the checks according to information printed on the MICR (magnetic ink character recognition) line located at the bottom of the check. The MICR information on the check includes the bank or transit number, account number, check serial number, in addition to the check amount encoded in step 102. The checks are read and sorted by bank or some other designation according to the transit and routing information present in the MICR line. Approximately 1 to 1.5% of checks are rejected because the MICR line information is not readable. The rejected checks are manually handled and corrected. A balance of credits and debits is then computed. The sorted checks, and a cash letter listing each check and their amounts, are then sent to the institutions owning the accounts that the checks are drawn on in a collection and transit process.

The transit process delivers the checks to the bank having the accounts the checks are drawn on, at which place another capturing process commonly termed "inclearing" is performed, as shown in block 106. Inclearing ensures that the checks are actually drawing on that bank's accounts, the amounts are encoded on the checks, the correct settlement amount is given to the other banks, and that the correct amount is finally settled or posted out of the customer's account, as shown in block 108. The checks may then be returned to the checking account owner, as shown in block 110.

It may be seen from the foregoing that the traditional check processing procedure is a time-consuming and tedious process. Each time the check is handled or encoded, an opportunity for error is introduced. As a result, check processing is a very costly procedure for banks and businesses.

SUMMARY OF THE INVENTION

Accordingly, there is a need for a system and method for check encoding at the time a check is tendered as payment at the point of sale.

In accordance with the present invention, a system and a method for automated check encoding at the point of sale (POS) are provided which eliminate or substantially reduce the disadvantages associated with prior check processing systems.

In an aspect of the present invention, an automated check encoding system at a point-of-sale includes a point-of-sale register for determining a transaction amount, and an input device coupled to the point-of-sale register for receiving the transaction amount and determining a check amount in response to receiving an input from a user. A check encoder is coupled to the point-of-sale register and the input device for receiving the check amount and encoding the check amount in a machine-readable format at a predetermined location on a blank check.

In another aspect of the present invention, a method for encoding checks at a point-of-sale includes the steps of first determining a transaction amount, receiving an input from a user in response to the transaction amount and determining a check amount, and receiving a blank check. The check amount is then encoded on the face of the blank check in a machine-readable format at a predetermined location at the point-of-sale.

In yet another aspect of the present invention, a method for encoding checks at a point-of-sale includes the steps of determining a transaction amount, receiving an input from a user in response to the transaction amount and determining a check amount, receiving a blank check. The payee name is then printed at a predetermined payee location on the blank check, a numeric check amount is printed on a predetermined numeric check amount location on the blank check, and the check amount is also printed in words on a predetermined word check amount location on the blank check. The check amount is further encoded on the face of the blank check in magnetic ink on a MICR line of the blank check. The encoded check is then issued to the user for payment at the point-of-sale.

In still another aspect of the invention, a pocket-size personal check encoder includes a keypad having a plurality of alphanumeric keys operable to receive a check amount from a user; a display coupled to the keypad and operable to display the check amount entered by the user; and a check encoder coupled to the keypad and display operable to receive the check amount from the keypad and encode the check amount in a machine-readable format at a predetermined location on a check.

BRIEF DESCRIPTION OF THE DRAWINGS

For a better understanding of the present invention, reference may be made to the accompanying drawings, in which.

DETAILED DESCRIPTION OF THE INVENTION

Figure 2:
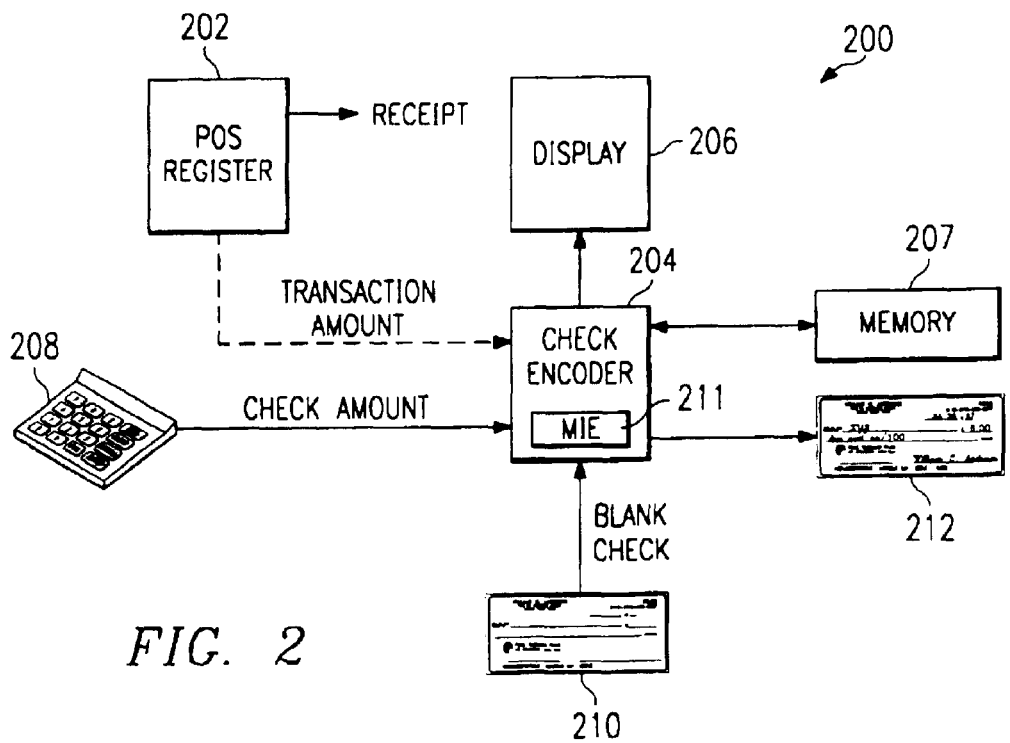
FIG. 2 is a simplified block diagram of an exemplary automated check encoding system at a point-of-sale constructed according to the teachings of the present invention.
Figure 3:
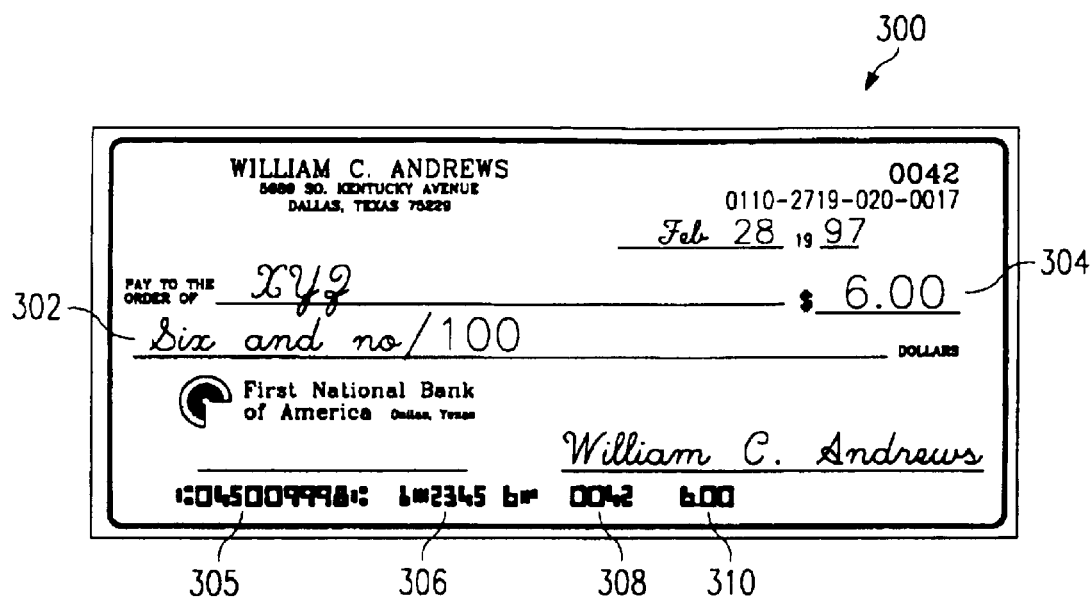
FIG. 3 is a representation of an exemplary check with an added magnetic ink character recognition (MICR) line field for check amount.
Figure 4:
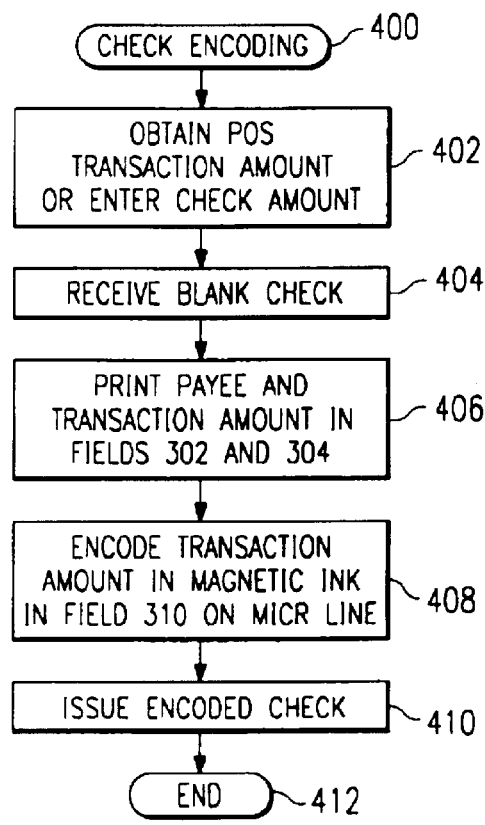
FIG. 4 is a flowchart of an exemplary automated POS check encoding process according to the teachings of the present invention.

The preferred embodiment(s) of the present invention is (are) illustrated in FIGS. 2–4, like reference numerals being used to refer to like and corresponding parts of the various drawings.

FIGS. 2 and 4 are a block diagram and a flowchart of automated point-of-sale check encoding system 200 and method 400 therefor, respectively, according to the teachings of the present invention and both are referenced below. Although the discussion below is in the context of a point-of-sale transaction, the check encoding system and method of the present invention are equally applicable to other scenarios where a check is presented as payment or for deposit into an account, or where a bank issues a cashier's check, for example.

As shown in block 402, a transaction amount becomes available as purchases are summed at a point-of-sale (POS) register 202 and a total is obtained. Alternatively, the cashier may also enter the amount of the transaction, or the customer may enter the amount of the check via an input device such as a keypad 208. Keypad 208 may include a plurality of keys, including numeric and function keys. When the check amount is entered manually by either the cashier or customer, it may override the transaction amount total in register 202. The transaction amount is then provided electronically to a check encoder 204, which may be coupled to register 202. This step is shown in step 402 of the check encoding process 400. The customer then provides a blank check 210, which is fed into check encoder 204, as shown in step 404.

FIG. 3 shows a graphical representation of an exemplary personal check 300. In check 300, there are two fields 302 and 304 for entering the check amount, written out alphabetically and written numerically, respectively. Further, check 300 includes a payee name field 301. A data line written in magnetic ink located on the bottom of check 300 contains the bank number 305, account number 306, and check serial number 308. Bank number 305 is also commonly termed the transit and routing number. The data line containing the magnetic ink information is also commonly called the MICR (magnetic ink character recognition) line, since this information, written in magnetic ink, is readable by MICR machines or readers. The MICR line data is pre-printed on the checks by the check printer.

Check encoder 204 optionally includes a display 206, which provides a preview of the information that will be printed and encoded on blank check 210. For example, it may display the payee name, which is the name of the store, for example, and the amount of the check. The customer may be required to verify that the displayed information is correct and push a certain button located on check encoder 204 or keypad 208 to authorize the check printing.

Figure 1:
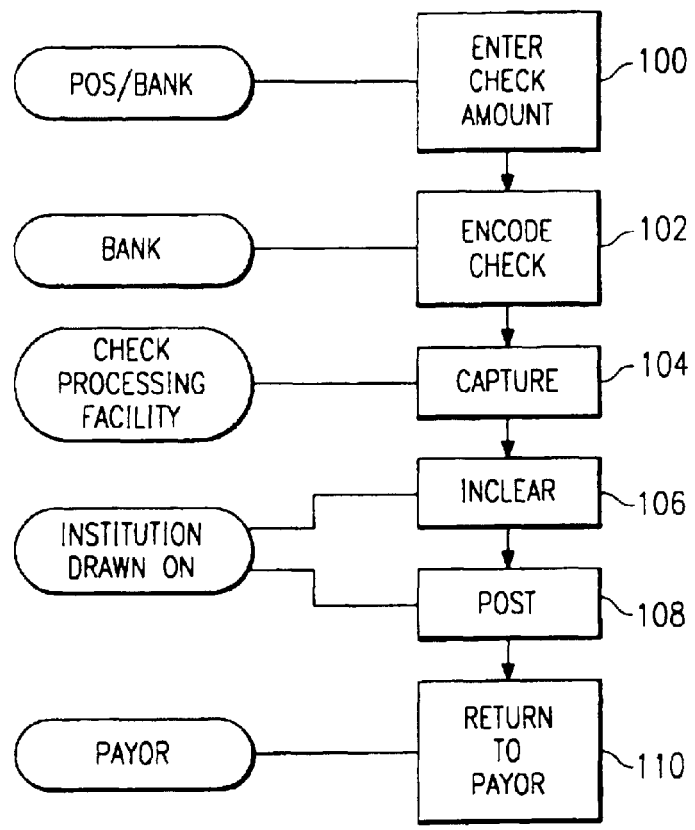
FIG. 1 is a simplified diagram of a typical back office check processing process.

Check encoder 204, upon receiving authorization, prints the payee name in field 301, and the check amount, in words and numerically, in fields 302 and 304, as shown in step 406. In a pocket-size personal check writer version of the present invention, check encoder 204 may also include a memory 207, which stores a list of frequent payee names, such as favorite retailers, utility companies, the landlord, mortgage companies, etc. The user is able to recall the list of payees from memory 207 and select one therefrom to be entered onto blank check 210. Thereafter, check encoder 204 encodes the check amount in magnetic ink in field 310 of the data line, as shown in step 408. Check encoder 204 may include a magnetic ink encoder (MIE) 211 which is capable of printing the check amount obtained from register 202 or keypad 208 in magnetic ink in a machine-readable format at a predetermined location (field 310) on check 300. Field 310 is preferably aligned with fields 305–308, so that the entire data line written in magnetic ink may be read by conventional MICR readers (not shown) used during check processing such as in step 104 shown in FIG. 1. At the completion of printing and encoding, check encoder 204 outputs the printed check 212, as shown in step 410. The check encoding process ends in step 412.

Although POS register 202 and check encoder 204 are shown in FIG. 2 as separate entities, they may be implemented by an integrated device that performs functions of both devices. Further, check encoder 204 may also be integrated with input device 208 and display 206. Although not described herein in detail, it may be seen that check encoder 204 includes a number of conventional components, such as a slot for receiving the check, a document feeder for forwarding the check to a print head, and MIE 211 for printing and encoding thereof.

As discussed above, the present invention may also be embodied in a pocket-size personal check writer device not coupled to point-of-sale register 202. In this embodiment, keypad 208 includes alphanumeric keys and memory 207 is operable to store frequent payee names and balance in the account.

Constructed and operating in this manner, checks are encoded at the point-of-sale when the checks are presented as payment. Check encoder 204 conveniently prints the payee name and check amounts on the face of the check as well as encoding the check amount in machine-readable format, which saves the customer's time in writing out the check. Therefore the check amount is verified and encoded at the time of presentment, rather than during check processing at the bank. The dollar amount encoded on the MICR line can be immediately verified at the point-of-sale. Accordingly, an expensive, labor-intensive and error prone check processing step is eliminated.

Although several embodiments of the present invention and its advantages have been described in detail, it should be understood that a myriad of mutations, changes, substitutions, transformations, modifications, variations, and alterations can be made therein without departing from the teachings of the present invention, the spirit and scope of the invention being set forth by the appended claims.

What is claimed is:

1. A portable check encoding device, comprising:
an input device operable to receive a check amount from a user and further operable to receive a payee name selected from a list of payee names by the user;
a memory operable to store and recall the list of payee names;
a display operable to display the check amount entered by the user and the list of payee names; and
a portable check printer operable to:
receive the check amount from the input device and encode the check amount in magnetic ink at a predetermined location on a check; and
receive the selected payee name and print the selected payee name in a payee field on the check.

2. The portable check encoding device, as set forth in claim 1, wherein the check printer is operable to encode the check amount on a MICR line of the check.

3. The portable check encoding device, as set forth in claim 1, wherein the check printer is further operable to print the check amount alphabetically in an alphabetical amount field and numerically in a numerical amount field on the check.

4. The portable check encoding device, as set forth in claim 1, wherein the check received by the check printer is a blank cheek, the blank check including an account number but not a payee name or check amount.

* * * * *